US009663661B2

(12) United States Patent
Kaupp et al.

(10) Patent No.: US 9,663,661 B2
(45) Date of Patent: May 30, 2017

(54) EFFECT PIGMENTS COMPRISING A GLASS FLAKE SUBSTRATE

(75) Inventors: Günter Kaupp, Neuhaus (DE); Ulrich Schmidt, Hersbruck (DE); Dirk Schumacher, Pegnitz (DE); Katrin Steinbach, Nürnberg (DE)

(73) Assignees: ECKART GMBH (DE); GLASSFLAKE LIMITED (GB)

( * ) Notice: Subject to any disclaimer, the term of this patent is extended or adjusted under 35 U.S.C. 154(b) by 1351 days.

(21) Appl. No.: 12/594,667

(22) PCT Filed: Apr. 4, 2008

(86) PCT No.: PCT/EP2008/002711
§ 371 (c)(1),
(2), (4) Date: Oct. 5, 2009

(87) PCT Pub. No.: WO2008/122420
PCT Pub. Date: Oct. 16, 2008

(65) Prior Publication Data
US 2010/0116169 A1    May 13, 2010

(30) Foreign Application Priority Data
Apr. 5, 2007  (EP) ..................................... 07007258

(51) Int. Cl.
| C09C 1/00 | (2006.01) |
| C09D 11/02 | (2014.01) |
| C09D 1/00 | (2006.01) |
| C03C 3/093 | (2006.01) |
| C03C 3/091 | (2006.01) |
| C03C 12/00 | (2006.01) |

(52) U.S. Cl.
CPC ............ *C09C 1/0051* (2013.01); *C03C 3/093* (2013.01); *C03C 12/00* (2013.01); *C09C 1/0021* (2013.01); *C09C 1/0024* (2013.01); *C09C 1/0078* (2013.01); *C01P 2002/50* (2013.01); *C01P 2004/03* (2013.01); *C01P 2004/54* (2013.01); *C01P 2004/61* (2013.01); *C09C 2200/102* (2013.01); *C09C 2200/24* (2013.01); *C09C 2200/301* (2013.01); *C09C 2200/302* (2013.01); *C09C 2200/303* (2013.01); *C09C 2220/106* (2013.01); *C09C 2220/20* (2013.01)

(58) Field of Classification Search
CPC .. C09C 1/00; C09D 11/02; C09D 1/00; C03C 3/093; C03C 3/091
USPC ......................... 106/441, 489; 501/36, 66, 67
See application file for complete search history.

(56) References Cited

U.S. PATENT DOCUMENTS

| 2,863,783 A | 12/1958 | Greenstein |
| 3,087,828 A | 4/1963 | Linton |
| 3,331,699 A | 7/1967 | Marshall et al. |
| 3,711,308 A | 1/1973 | Brand et al. |
| 3,832,208 A | 8/1974 | Jackson |
| 3,874,890 A | 4/1975 | Bernhard et al. |
| 3,926,659 A | 12/1975 | Bernhard et al. |
| 4,069,186 A * | 1/1978 | Ramig ........................ 523/221 |
| 4,086,100 A | 4/1978 | Esselborn et al. |
| 4,456,486 A | 6/1984 | Bernhard |
| 4,457,784 A | 7/1984 | Bernhard |
| 4,482,389 A | 11/1984 | Franz et al. .................. 106/291 |
| 4,494,993 A | 1/1985 | Bernhard et al. |
| 4,509,988 A | 4/1985 | Bernhard |
| 4,537,636 A | 8/1985 | Bernhard et al. |
| 4,565,581 A | 1/1986 | Bernhard |
| 5,221,341 A | 6/1993 | Franz et al. |
| 5,433,779 A | 7/1995 | DeLuca, Jr. |
| 5,565,025 A | 10/1996 | Schraml-Marth |
| 5,958,125 A | 9/1999 | Schmid et al. |
| 6,132,873 A | 10/2000 | Dietz et al. |
| 6,596,070 B1 * | 7/2003 | Schmidt et al. .............. 106/417 |

(Continued)

FOREIGN PATENT DOCUMENTS

| AU | 622690 | 1/1990 |
| DE | 14 67 468 | 12/1968 |

(Continued)

OTHER PUBLICATIONS

International Search Report dated Aug. 6, 2008, 2008, issued in corresponding international application No. PCT/EP2008/002711.
European Search Report dated Oct. 11, 2007, issued in corresponding European priority application No. 07007258.2.
Morten C. Meilgaard/Gail Vance Civille/B. Thomas Carr "Sensory Evaluation Techniques," CRC Press, 4th ed., Chapter 7: Attribute Difference tests.
Römpp Lexikon, Lack und Druckfarben, 1998, Georg Thieme Verlag, Stuttgart, Germany, pp. 73 and 74, "Bindemittel" (English translation only).
Notice of Reasons for Rejection dated Oct. 30, 2012 in corresponding Japanese Patent Application No. 2010-501440.

(Continued)

*Primary Examiner* — Pegah Parvini
(74) *Attorney, Agent, or Firm* — Ostrolenk Faber LLP

(57) ABSTRACT

The present invention relates to an effect pigment comprising as a substrate a glass flake with a coating, said coating comprising at least one layer of at least one high refractive material, said material having a refractive index of at least 1.8, and/or at least one layer of at least one semitransparent metallic material, wherein said glass flakes comprising the following composition: 65-75 wt.-% silicon oxide, preferably $SiO_2$ 2-9 wt.-% aluminum oxide, preferably $Al_2O_3$ 0.0-5 wt.-% calcium oxide, preferably CaO 5-12 wt.-% sodium oxide, preferably $Na_2O$ 8-15 wt.-% boron oxide, preferably $B_2O_3$ 0.1-5 wt.-% titanium oxide, preferably $TiO_2$ 0.0-5 wt.-% zirconium oxide, preferably $ZrO_2$ based on the weight of said glass flakes. The invention relates also to a method for producing the effect pigments as well as to the use of said effect pigments. The invention further relates to coating formulations based on the effect pigments.

26 Claims, 2 Drawing Sheets

(56) References Cited

U.S. PATENT DOCUMENTS

| | | | |
|---|---|---|---|
| 7,604,862 B2 | 10/2009 | Ambrosius et al. | |
| 2001/0001174 A1 | 5/2001 | Andes et al. | |
| 2004/0139889 A1* | 7/2004 | Zimmermann et al. | 106/415 |
| 2004/0170838 A1* | 9/2004 | Ambrosius et al. | 428/406 |
| 2004/0226480 A1 | 11/2004 | Greiwe et al. | |
| 2005/0061033 A1* | 3/2005 | Petrany et al. | 65/134.9 |
| 2006/0042508 A1 | 3/2006 | Henglein et al. | |
| 2006/0042509 A1 | 3/2006 | Henglein et al. | |
| 2006/0205583 A1* | 9/2006 | Naumann et al. | 501/66 |
| 2006/0223910 A1 | 10/2006 | Bagala, Sr. | |
| 2006/0225609 A1* | 10/2006 | Rueger et al. | 106/31.9 |
| 2007/0289496 A1* | 12/2007 | Kieser et al. | 106/287.19 |
| 2008/0168924 A1 | 7/2008 | Melson et al. | |
| 2009/0311209 A1 | 12/2009 | Bujard | |
| 2010/0095868 A1* | 4/2010 | Kaupp et al. | 106/417 |

FOREIGN PATENT DOCUMENTS

| | | | |
|---|---|---|---|
| DE | 19 59 998 | 7/1971 | |
| DE | 20 09 566 | 11/1971 | |
| DE | 22 14 545 | 10/1972 | |
| DE | 22 15 191 | 10/1972 | |
| DE | 22 44 298 | 3/1974 | |
| DE | 23 13 331 | 9/1974 | |
| DE | 25 22 572 | 12/1976 | |
| DE | 31 37 808 | 3/1983 | |
| DE | 31 37 809 | 3/1983 | |
| DE | 31 51 343 | 7/1983 | |
| DE | 31 51 354 | 7/1983 | |
| DE | 3151355 | 7/1983 | |
| DE | 32 11 602 | 10/1983 | |
| DE | 32 35 017 A1 | 3/1984 | |
| DE | 38 24 809 | 3/1990 | |
| DE | 44 29 797 | 3/1995 | |
| DE | 196 18 566 A1 | 11/1997 | |
| DE | 196 38 708 A1 | 4/1998 | |
| DE | 10 2004 039 554 A1 | 2/2006 | |
| DE | 10 2004 041 586 A1 | 3/2006 | |
| DE | 10 2004 041 592 A1 | 3/2006 | |
| EP | 0289 240 A1 | 11/1988 | |
| EP | 0520 313 | 12/1992 | |
| EP | 0753 545 A2 | 7/1996 | |
| EP | 0912 640 B1 | 3/2000 | |
| EP | 1025 168 A1 | 8/2000 | |
| EP | 1 340 715 A | 9/2003 | |
| EP | 1 829 833 B1 | 9/2007 | |
| GB | 1359933 | 7/1974 | |
| JP | 7-246366 | 9/1995 | |
| JP | 2002-069355 | 3/2002 | |
| JP | 2002-509561 | 3/2002 | |
| JP | 2004-533510 | 11/2004 | |
| JP | 2004-352725 | 12/2004 | |
| JP | 2005-502738 | 1/2005 | |
| JP | 2005-187782 A | 7/2005 | |
| JP | 2008-546880 | 12/2008 | |
| WO | WO 97/46624 A | 12/1997 | |
| WO | WO 99/57204 | 11/1999 | |
| WO | WO 02/081394 | * 10/2002 | C03C 3/091 |
| WO | WO 02/090448 A2 | 11/2002 | |
| WO | WO 2004/056716 A1 | 7/2004 | |
| WO | WO 2005/063637 A1 | 7/2005 | |
| WO | WO 2006/042610 | * 4/2006 | C08K 9/02 |
| WO | WO 2006/068255 | 6/2006 | |
| WO | WO 2006/136435 | * 12/2006 | C04B 14/20 |

OTHER PUBLICATIONS

Morten C. Meilgaard/Gail Vance Civille/B. Thomas Carr, Dec. 13, 2006, "Sensory Evaluation Techniques," CRC Press, 4$^{th}$ ed., Chapter 7: Attribute Difference tests.

Römpp Lexikon, Lack and Druckfarben, 1998, Georg Thieme Verlag, Stuttgart, Germany, pp. 73 and 74, "Bindemittel" (=binders); Römpp, op. cit., pp. 274 to 276, "Härtung" (=curing processes); Römpp, op. cit., p. 425, "Oligomere" (=oligomers); Römpp, op. cit., p. 457, "Polyaddition" and "Polyadditionsharze (Polyaddukte)" (=polyaddition and polyaddition resins), and also pp. 463-464, "Polykondensat", "Polykondensation" and "Polykondensationsharze" (=polycondensates, polycondensation and polycondensation resins), and also pp. 73 and 74, "Bindemittel" (=binders); and Römpp, op. cit., pp. 250 ff., "Füllstoffe" (=fillers).

\* cited by examiner

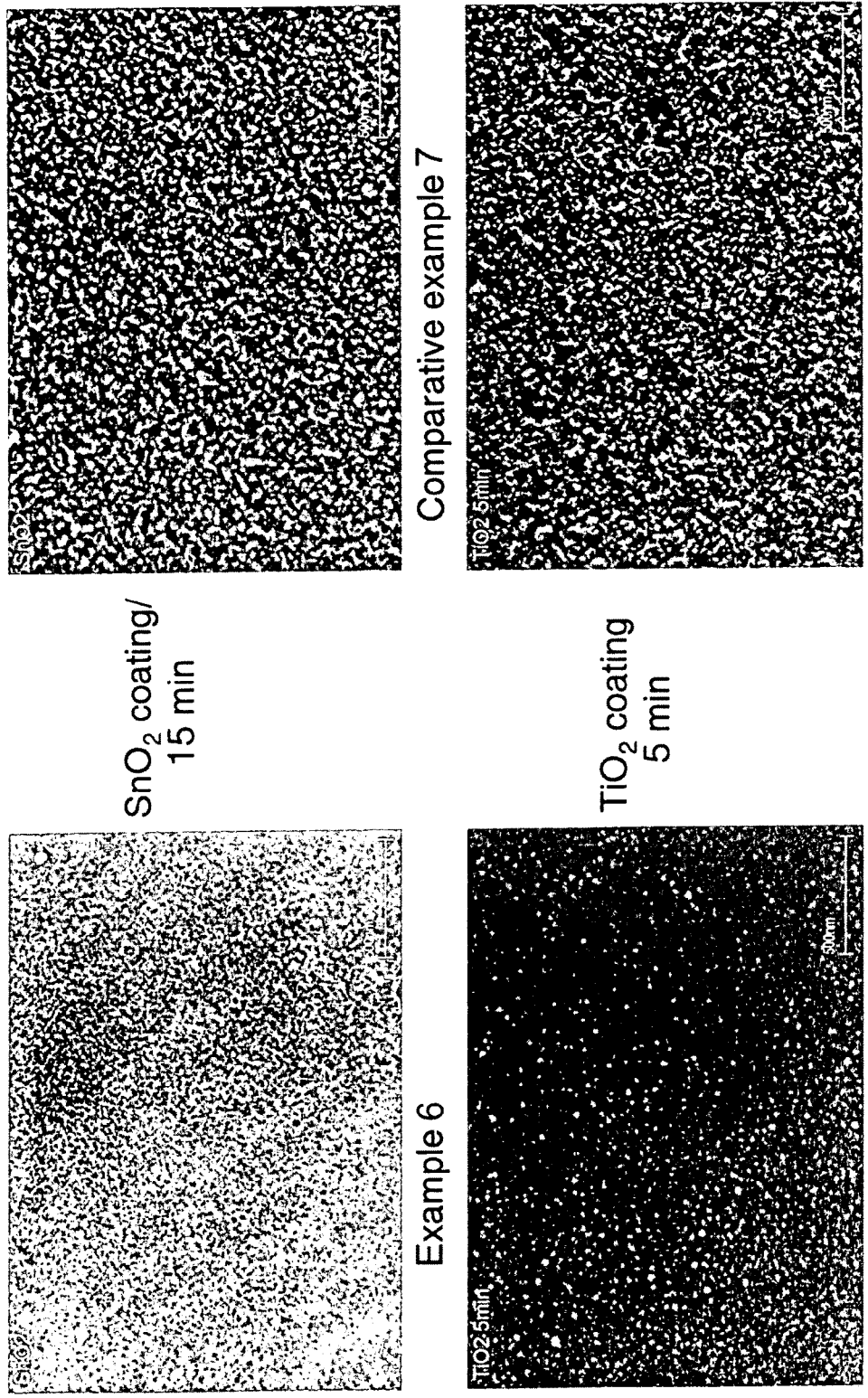

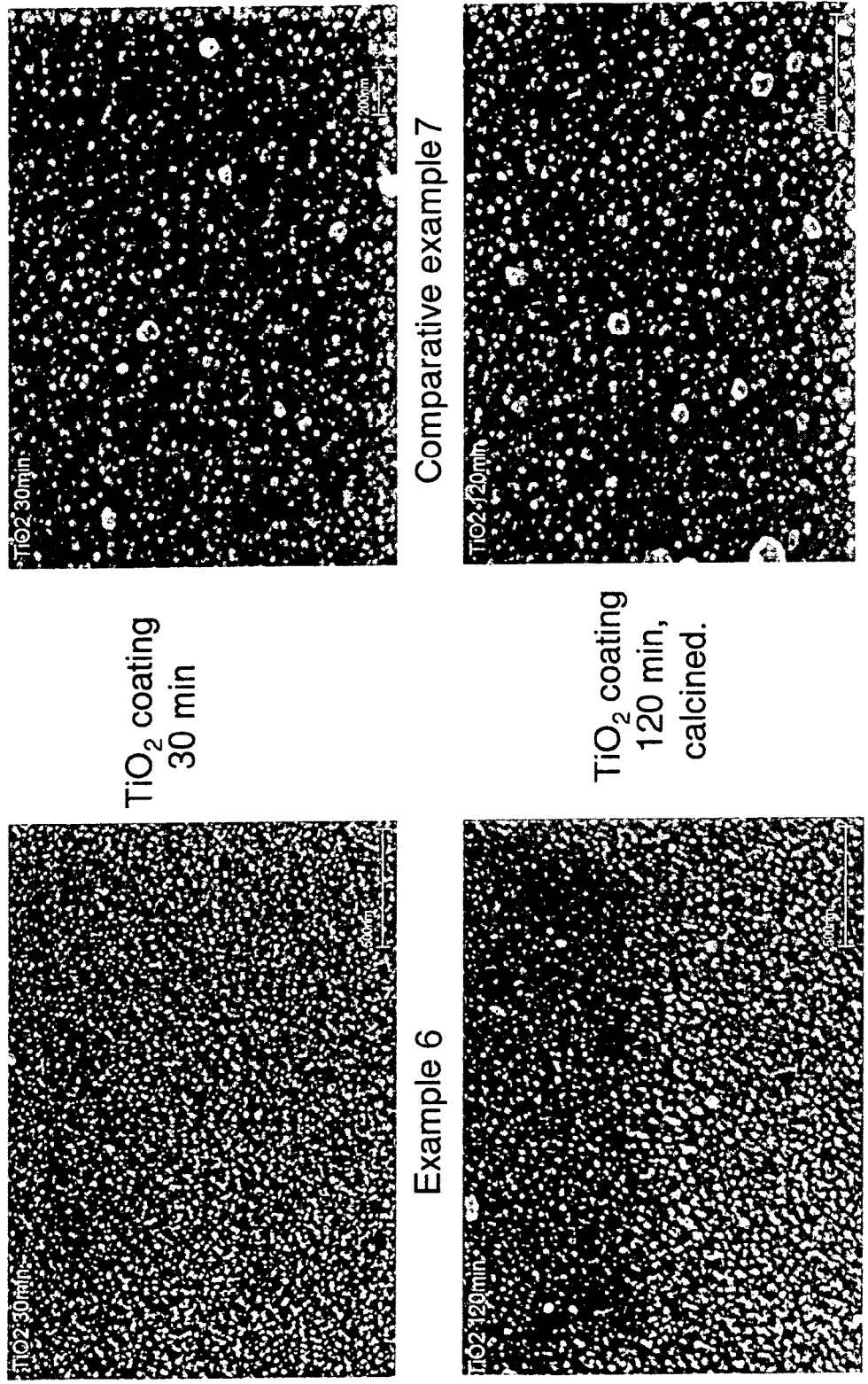

EFFECT PIGMENTS COMPRISING A GLASS FLAKE SUBSTRATE

CROSS REFERENCE TO RELATED APPLICATIONS

The present application is a 35 U.S.C. §371 National Phase conversion of PCT/EP2008/002711, filed Apr. 4, 2008, which claims benefit of European Application No. 07007258.2, filed Apr. 5, 2007, the disclosure of which is incorporated herein by reference. The PCT International Application was published in the English language.

TECHNICAL FIELD

The present invention is directed to an effect pigment comprising glass flakes with a coating, said coating comprising at least one layer of at least one high refractive material, said material having a refractive index of at least 1.8, and/or at least one layer of at least one semitransparent metallic material. The invention is further directed to the use of these effect pigments as well as to formulations and preparations containing said effect pigments. Moreover, the invention relates to a method of producing these effect pigments. The invention is further directed to coating compositions containing these effect pigments.

BACKGROUND OF THE INVENTION

Recently, glass flakes have received an increased attention as a substrate for effect pigments, particularly pearlescent pigments. Glass flakes or glass platelets have a very smooth surface and can be produced with rather uniform thickness, compared to mica substrates traditionally used as a substrate in pearlescent pigments (WO 2005/063637 A1). Pearlescent pigments based on glass flake substrates exhibit improved optical properties such as stronger chroma, higher colour purity and higher gloss when compared to traditional mica based pigments.

U.S. Pat. No. 3,331,699 discloses a pigment composition consisting essentially of glass flakes on which a very thin nucleating surface of a metal oxide compound is deposited at first. Subsequently, high refractive metal oxides are precipitated on said thin nucleating surface. The nucleating layer can be comprised of tin oxide or aluminium oxide hydroxide and is necessary to improve the adhesion of the subsequently applied metal oxide layers. As shown in WO 02/090448, the effect pigments obtained according to the teaching of U.S. Pat. No. 3,331,699 are poor in quality with respect to today's requirements and expectations.

U.S. Pat. No. 2,863,783 discloses the utilization of platelets or lamellae of glass in nacreous compositions. A glass lamellae is described with a content of $TiO_2$ of 50.4% and a refractive index of 1.80. Such a composition has a refractive index to high to be used as a substrate material of pearlescent pigments. Furthermore, it has a very high softening point and is very expensive due to the high content of $TiO_2$.

JP 7-246366 discloses pearlescent pigments on the basis of C glass flakes coated alternately with layers of titanium dioxide and silica. Pursuant to the teaching of JP 7-246366 tin oxide is also used to improve the adhesion of the layer of $TiO_2$.

EP 0 912 640 B1 also discloses a pearlescent pigment comprising flakes of C glass having a first coating comprising iron oxide or rutile titanium dioxide thereon. Pursuant to the teaching of EP 0 912 640 B1 it is not possible to obtain pearlescent pigments having a high quality on the basis of flakes of A glass or E glass coated with metal oxide. The skilled person reads from EP 0 912 640 B1 that flakes of C glass are the only glass flakes which allow to produce high quality effect pigments.

WO 02/090448 A2 likewise discloses effect pigments on the basis of glass flakes with a thickness below 1 µm and which are coated with one or more layers with a high and/or low refractive index. Pursuant to the teaching of WO 02/090448 A2 quartz glass is the preferred glass as a substrate for effect pigments. Furthermore, any other glass composition having a softening point of ≥800° C. like e.g. Schott Duran or Supremax types can be used.

A glass type having a softening point of more than 800° C., disadvantageously, increases the costs for producing the glass flakes. As effect pigments are used in large amounts in printing inks, coating compositions, plastics, etc., it is desired to lower the costs for production of glass flakes in order to be able to economically produce effect pigments.

EP 1 340 715 discloses glass flakes onto which titanium oxide of rutile type is deposited. To promote the fixing of the titanium oxide of rutile type a compound selected from the group of platinum, palladium and palladium compound can be applied to the glass flake first. According to the teaching there are no particular limitations on the type of glass used for the glass flake substrate.

DE 10 2004 039 554 A1 discloses pearlescent pigments on the basis of glass flakes. DE 10 2004 039 554 A1, like EP 1 340 715, teaches that the composition of the glass flake substrate is of no importance for the properties of use.

JP 2005-187782 A teaches to use pearlescent pigments on the basis of a glass flake substrate wherein the glass flake substrate has a A-glass or E-glass composition which do not contain boric acid or lead oxide at all.

Moreover, pearlescent pigments based on $Al_2O_3$-platelets are known. However, these pearlescent pigments are available only in sizes below about 30 µm. Manufactures of pearlescent pigments for the cosmetic market, however, want to offer a product program of various sizes based on a single source of substrate. $SiO_2$-flakes are expensive to produce and quite difficult to be produced in constant quality. Furthermore they exhibit extremely high colourflops which are not always demanded. Glass flakes would be the best choice as artificial substrates for effect pigments, especially for pearlescent pigments, because they can be produced reproducibly at fairly low costs and are achievable in various sizes and thickness.

Although glass flakes have been shown to be able to replace mica or $Al_2O_3$ platelets as substrate for pearlescent pigments, there is still a need for further optimised flakes yielding effect pigments with better gloss and skin feeling properties, especially when used in cosmetics.

SUMMARY

In view of the drawbacks encountered in the prior art it is desired to provide effect pigments on the basis of glass flakes which can be economically produced and which allow to produce effect pigments with a higher quality than known in the state of the art.

Furthermore it is desirable to use glass flakes which can be produced economically with low energy costs and have surface properties which allows those glass flakes to be coated uniformly with subsequent layers to provide pearlescent pigments with an improved optical appearance.

The object underlying the present invention is solved by providing an effect pigment comprising as a substrate a glass flake with a coating, said coating comprising at least one layer of at least one high refractive material, said material having a refractive index of at least 1.8, and/or at least one layer of at least one semitransparent metallic material, wherein said glass flakes comprising the following composition:
65-75 wt.-% silicon oxide, preferably $SiO_2$
2-9 wt.-% aluminium oxide, preferably $Al_2O_3$
0.0-5 wt.-% calcium oxide, preferably CaO
5-12 wt.-% sodium oxide, preferably $Na_2O$
8-15 wt.-% boron oxide, preferably $B_2O_3$
0.1-5 wt.-% titanium oxide, preferably $TiO_2$
0.0-5 wt.-% zirconium oxide, preferably $ZrO_2$
based on the weight of said glass flakes.

Preferred embodiments are specified in dependent claims 2 through 20

Another object of the present invention is solved by a method of producing an effect pigment, comprising the steps:
  (a) coating glass flakes comprising the following composition:
    65-75 wt.-% silicon oxide, preferably $SiO_2$
    2-9 wt.-% aluminium oxide, preferably $Al_2O_3$
    0.0-5 wt.-% calcium oxide, preferably CaO
    5-12 wt.-% sodium oxide, preferably $Na_2O$
    8-15 wt.-% boron oxide, preferably $B_2O_3$
    0.1-5 wt.-% titanium oxide, preferably $TiO_2$
    0.0-5 wt.-% zirconium oxide, preferably $ZrO_2$
  based on the weight of said glass flakes, with at least one layer of at least one high refractive material, said material having a refractive index of at least 1.8, and/or with at least one layer of at least one semitransparent metallic material,
  (b) optionally calcining said layered glass flakes obtained by step (a).

The inventors have found out that adding titanium oxide to the composition of the glass flake substrate has a beneficial effect with respect to the strength of adhesion of subsequent layers. Surprisingly, already small amounts of titanium oxide increase the strength of adhesion of subsequent layers of high refractive material having a refractive index of at least 1.8, preferably of metal oxide(s), and/or of a metallic material.

Mechanical stability of effect pigments is of essential importance for all applications.

On mechanical stress, exhibited for example by shear forces during application of the pigment in a cosmetic formulation on the skin, during printing or manufacturing of pigment preparations or master batches, or during pumping of effect pigment dispersions in circulation lines, partial or full delamination of metal oxide layer(s) or semitransparent metallic layer(s) is often observed in the prior art and represents a serious problem.

Shear forces are usually applied either during mixing and dispersing of effect pigments or during line circulation or during application itself, e.g., nozzle spraying. Also when recycling effect pigments after application—such as recycling of over-spray of powder lacquer—a sufficient mechanical stability is a requirement for the re-use of the recycled effect pigments. If the effect pigments do not have a sufficient mechanical stability, the pigments are damaged and can not be re-used for high quality applications.

Therefore, the high refractive material such as metal oxide layer(s) and/or the metallic material must adhere firmly to the substrate in order to prevent rupture or stripping of the high refractive material, such as metal oxide layer(s), and/or of the metallic material, such as semitransparent metallic layer(s), in the later application by shear forces induced, e.g., during extrusion of plastics containing effect pigments. A limited adhesion of the metal oxide layer(s) and/or semitransparent metallic layer(s) on a glass flake due to an inadequate mechanical stability of the pearlescent pigment results in a significant loss of gloss and of the pearlescent effect. Even a small portion of damaged pigment particles might cause a significant deterioration of colour properties and of brilliance in the final application of the pigment, for example in automotive coatings.

Surprisingly, the strength of adhesion can be further improved by incorporation of small amounts of titanium oxide, preferably titanium dioxide, into glass compositions used in the production of effect pigments of the present invention. The at least one layer of high refractive material and/or at least one layer of semitransparent metallic material of the effect pigments of the present invention is firmly adhered to the glass flake containing titanium oxide, preferably titanium dioxide. The content of titanium oxide is preferably in a range of 0.5 to 2.5 wt.-%, and more preferably in a range of 1 to 2 wt.-%, based on the weight of said glass flake.

A content above 5 wt.-% of $TiO_2$ does not further improve the strength of adhesion of subsequent layers in the glass composition as specified in claim 1. Therefore, further increasing the content of titanium oxide unnecessarily increases the costs and reduces the difference in the index of refraction of the glass substrate and the at least one high refractive index layer and/or semitransparent metallic layer. The larger the difference of the refractive index of the glass flake substrate and of the subsequent layer(s) of high refractive material and/or semitransparent metallic material the stronger are interference effects of the obtained pearlescent pigments. A stronger interference effect can lead, for example, to a stronger colour flop of the pearlescent pigment.

Moreover, the inventors found out that the pearlescent pigments of the present invention have a superior mechanical stability and reduced hardness. Mechanical stability in the context of present invention means that the pearlescent pigments are stable against mechanical forces, e.g., shear forces to which pearlescent pigments are exposed during line circulation, i.e. when pumping media comprising pearlescent pigments through a ring pipe. The great advantage of a reduced hardness of pearlescent pigments is, for example, that the pipe or nozzles through which the pearlescent pigments containing medium is pumped, e.g. as paint or printing ink, is not damaged by abrasion, what is the case with pigments having an increased hardness.

Surprisingly, the pearlescent effect pigments of the present invention do combine the features of a superior mechanical stability and reduced hardness. It is assumed that the reduced hardness is associated with the low contents of aluminium oxide and calcium oxide in the glass composition, respectively.

Surprisingly, the pearlescent pigments of the present invention have also a softer skin feeling, which renders these pearlescent pigments particular useful as an ingredient for cosmetics.

DETAILED DESCRIPTION

Preferably, the said glass composition comprises a content of 67-73 wt.-% of silicon oxide, preferably $SiO_2$, based on the weight of said glass flake.

Preferably, the said glass composition comprises a content of 4-7 wt.-% of aluminium oxide, preferably $Al_2O_3$, based on the weight of said glass flake.

Preferably, the said glass composition comprises a content of 0.5-2.5 wt.-% and more preferably 1-2.5 wt.-% of calcium oxide, preferably CaO, based on the weight of said glass flake.

Preferably, the said glass composition comprises a content of 8.5-14 wt.-% of boron oxide, preferably $B_2O_3$, more preferably of 9-13 wt.-% of boron oxide, preferably $B_2O_3$, based on the weight of said glass flake.

Preferably, the said glass composition comprises a content of zirconium oxide, preferably $ZrO_2$ of 0.05 to 3.0 wt.-%, preferably of 0.1 to 1.5 wt.-%, based on the weight of said glass flake.

Preferably, the said glass composition comprises a content of sodium oxide, preferably $Na_2O$, of 6 to 11 wt.-% based on the weight of said glass flake.

In a further embodiment of the said glass composition comprises the following further components:

0 to 6 wt.-%, preferably 1 to 4 wt.-%, potassium oxide and/or lithium oxide, preferably $K_2O$ and $Li_2O$, respectively, and/or 0 to 6 wt.-%, preferably 1.0 to 4.0 wt.-% magnesium oxide, preferably MgO.

The sum of all components of the above glass compositions, including those components not mentioned above do amount in total each to 100 wt.-%.

The glass flake composition of this invention is not a C-glass which is characterised by its superior corrosion resistance. The glass flake composition used for the effect pigments of the present invention is less corrosion resistant than C-glass. Especially in distilled water and in acidic environments the glass flake composition used in the present invention proved to be less corrosion resistant.

In view of EP 0 912 640 B1 teaching that only C-glass flakes can be used for producing pearlescent pigments of high quality, it is very surprising that pearlescent pigments of very high optical qualities are obtained with a glass flake composition having lower corrosion resistance.

Coating of glass flakes with high refractive index materials such as $TiO_2$ is usually done in aqueous media at pH 1-2 and at elevated temperatures. One would expect that using glass flakes of low corrosion stability under these conditions would lead to a very strong roughening of the surface of the glass flake due to dissolution of ions. This would finally lead to a low quality of pearlescent pigments with respect to optical properties like gloss and/or colour flops.

Surprisingly, the inventors found that pearlescent pigments with higher gloss can be produced using a glass flake composition of this invention compared to C-glass.

Without being bound to theory it is believed that this unexpected effect is due to a much finer particle size of the coating of the high refractive index material. High refractive index materials, especially metal oxides are well known to be coated in form of oxide grains. Larger grains in the range of more than 50 nm, e.g. more than 75 nm and e.g. more than 100 nm can lead to significant scattering which reduces the gloss of such pearlescent pigments.

It turned surprisingly out that the oxide grains formed on the surface of the glass flakes used in the present invention are very small or fine resulting in a very smooth coating with metal oxide layer(s), such as, e.g., a coating of titanium oxide and/or iron oxide, what in turn results in superior optic properties of the pearlescent pigments of the present invention.

It is currently not understood why glass flakes of the composition of this invention lead to such an effect.

Without being bound to a theory it is currently believed that the lower corrosion resistance compared to the commonly used C-glass of the inventive glassflakes is the reason for the above-mentioned effect. The coating of the high refractive index materials such as $TiO_2$ occurs at low pH-values of about 1-2. Some metals of the glass flake may be dissolved under these conditions leading to flaws and enhancing the probability to form metal hydroxide and especially silanol functions on the surface of the glass flake. These hydroxide groups can function as excellent binding sites and thus nucleation centers for the precipitating metal oxide precursors. Thus the metal oxide binds better to the glass flakes surface which is very important in the very early stages of the precipitation process. Consequently, the metal oxide can be precipitated in a much finer grain size. Such finer grain sizes of the high refractive index metal oxide in turn lead to lower scattering and thus enhanced gloss and optical properties.

In a further preferred embodiment of the invention the said glass composition has a softening point below 800° C. Such a glass can be produced with less energy costs and hence less total costs. Pursuant to a preferred embodiment of the invention the softening point of the glass composition is in a range of 600° C. to less than 800° C., preferably from 620° C. to 750° C. and further preferred from 650° C. to 700° C.

The aforementioned glass compositions have been proven to be particularly useful for the present invention. In the prior art either the composition of the glass flakes has been regarded to be of no importance, see e.g. EP 1 340 715 A1 or DE 10 2004 039 554 A1, or only C-Glass has been regarded as the glass of choice, see e.g. EP 0 912 640 B1.

The inventors of the present invention have realised that the composition of the surface of a glass substrate can have a significant impact on the optical properties of pearlescent pigments using glass flakes as a substrate, in particular if these glass flakes are coated with several layers. Outstanding effect pigments are obtained using the glass flake substrates with the composition described herein.

Preferably, the glass flakes, containing preferably titanium oxide, used in the present invention have a refractive index of less than 1.8. Most preferably the refractive index of the glass flakes is within a range of 1.40 to 1.80, more preferred in a range of 1.45 to 1.7 and mostly preferred in a range of 1.50 to 1.60.

Pursuant to another preferred embodiment of the invention, the difference between the refractive index of the glass flake, containing titanium oxide, and the subsequently applied layer or layers of high refractive material(s) is at least 0.6, more preferably at least 0.8 and further preferred at least 1.0. According to another preferred embodiment, the difference of the refractive index between the glass flakes substrate and the subsequently applied layer(s) of high refractive material(s) is in a range of 0.9 to 1.3.

When applying titanium dioxide in the rutile modification, having a refractive index of 2.7, as a high refractive material on a glass flake, having a content of titanium dioxide, as specified in claim 1, it is possible to obtain a difference of refractive index between said glass flake and the subsequent titanium dioxide layer in a range of 0.9 up to 1.3, preferably of 1.0 to 1.2.

According to an embodiment of the invention one or more layers of high refractive material(s), such as metal oxide(s) or metal sulfide(s), can be coated directly on each other.

The high refractive materials, for example metal oxide(s), metal sulfide(s), preferably have a refractive index of at least 2.0, further preferred of at least 2.2. Pursuant to another embodiment of the invention the refractive index of the high refractive material(s) is at least 2.3. The refractive index can be up to 2.7, 2.9 or 3.2.

For example, a layer of $TiO_2$ can be directly applied on the surface of the glass flakes containing titanium oxide, preferably $TiO_2$, followed by a subsequent layer of $Fe_2O_3$, or vice versa. If the glass flake substrate contains titanium oxide, preferably $TiO_2$, the glass flake substrate itself is very suitable for being subsequently coated with a high refractive material, e.g. $TiO_2$, or metallic material, wherein the subsequent layer(s) firmly adhere to the glass flake substrate. It is, of course, also possible to directly apply a layer composed of a mixture of various high refractive materials such as metal sulfides or metal oxides. A particular useful mixture of metal oxides is a mixture of $TiO_2$ and $Fe_2O_3$.

According to another embodiment of the invention the layer of high refractive material, e.g. metal oxide and/or metal sulfide, directly applied to the surface of the glass flakes can be doped with tin oxide and/or aluminium oxide. Such doping with tin oxide and/or aluminium oxide may also increase the adhesion between the high refractive material layer on the surface of the glass flakes. When applying an intermediate layer of aluminium oxide or when using aluminium oxide as a doping agent, it is preferred to use aluminium oxide in the boehmite modification.

According to a preferred embodiment of the invention the high refractive material is selected from the group consisting of metal chalcogenides, particularly metal oxides, metal suboxides and metal sulfides, metal oxyhalides, metal nitrides, metal carbides, semitransparent metals and mixtures thereof.

Preferably said high refractive material is preferably selected from the group of metal oxides consisting of titanium dioxide, iron oxides, e.g. hematite, magnetite, goethite, chromium oxide, copper oxide, zinc oxide, tin oxide, vanadium oxide, nickel oxide, antimony oxide, lead oxide, silver oxide, molybdenum oxide, tungsten oxide, zirconium oxide, suboxides and mixtures thereof.

Pursuant to another embodiment of the invention said high refractive material is selected from the group of metal sulfides consisting of titanium sulfide, iron sulfide, chromium sulfide, copper sulfide, zinc sulfide, tin sulfide, nickel sulfide, vanadium sulfide, cobalt sulfide, antimony sulfide, lead sulfide, silver sulfide, lanthanum sulfides, preferably cerium sulphide, molybdenum sulfide, tungsten sulfide, zirconium sulfide, subsulfides and mixtures thereof.

Particularly preferred effect pigments of the present invention are glass flakes comprised a composition according to claim 1 and comprising or consisting of coatings with the specified high refractive material:
glass flake+$TiO_2$ layer with $TiO_2$ being in the rutile modification
glass flake+$TiO_2$ layer with $TiO_2$ being in the anatase modification
glass flake+$Fe_2O_3$ layer
glass flake+$TiO_2$/$Fe_2O_3$ layer with $TiO_2$ being in the rutile modification
glass flake+$TiO_2$/$Fe_2O_3$ layer with $TiO_2$ being in the anatase modification
glass flake+$TiO_2$ layer+$Fe_2O_3$ layer with $TiO_2$ being in the rutile modification
glass flake+$TiO_2$ layer+$Fe_2O_3$ layer with $TiO_2$ being in the anatase modification
glass flake+$Fe_2O_3$ layer+$TiO_2$ layer with $TiO_2$ being in the rutile modification
glass flake+$Fe_2O_3$ layer+$TiO_2$ layer with $TiO_2$ being in the anatase modification
glass flake+$TiFe_2O_5$ layer
glass flake+$Cr_2O_3$ layer
glass flake+$ZrO_2$ layer
glass flake+$Sn(Sb)O_2$ layer
glass flake+BiOCl layer
glass flake+$Al_2O_3$ layer+$TiO_2$ layer with $TiO_2$ being in the rutile modification
glass flake+$SnO_2$ layer+$TiO_2$ layer with $TiO_2$ being in the rutile modification
glass flake+$Al_2O_3$/$TiO_2$ layer with $TiO_2$ being in the rutile modification
glass flake+$SnO_2$/$TiO_2$ layer with $TiO_2$ being in the rutile modification
glass flake+$Ce_2S_3$ layer
glass flake+$MoS_2$ layer The $TiO_2$-coating can exist in the rutile or anatase modification, preferably rutile. In order to apply a titanium dioxide coating in the rutile modification a precoat comprising or consisting of $SnO_2$, $Al_2O_3$ or $Fe_2O_3$ is first applied followed by a subsequent layer of titanium dioxide. The thicknesses' of the precoating $SnO_2$ or $Fe_2O_3$ is preferably <10 nm and most preferably <5 nm.

The thickness of a layer of the high refractive material, e.g., a metal oxide layer such as a $TiO_2$ layer or a $Fe_2O_3$ layer, is usually within a range of 0.1 nm to 1000 nm, preferably in a range of 5 nm to 500 nm, more preferably in a range of 10 nm to 300 nm. The thickness of the layer of high refractive material such as metal oxide(s) can also be in the range of 25 nm to 100 nm. The aforementioned values of thickness do apply likewise for metal sulfide layer(s).

Pursuant to another embodiment of the invention said semitransparent metallic material is selected from the group consisting of aluminium, chromium, titanium, copper, silver, gold, platinum, molybdenum, iron, tin, zinc, tantalum, its mixtures and alloys.

The term "semitransparent" means a transparency of 10 to 90%, preferably of 30 to 70% and most preferably of 40 to 60%, respectively. Thin metal layers of these transparencies are capable to give rise to interference effects with the underlying glass flake substrate.

The thickness of these semitransparent metal layers is preferably in a range of between 2 nm and 20 nm, preferably between 3 nm and 15 nm.

The semitransparent metal can be coated directly on the glass flake. In this case an interference effect pigment is obtained with a rather metallic appearance.

In another embodiment of the invention this interference pigment can be further coated with high refractive materials.

In another embodiment of the invention the semitransparent metal layer is coated onto a first layer of high refractive index materials.

Particularly preferred effect pigments of the present invention are glass flakes comprising a composition according to claim 1 and comprising or consisting of coatings with the specified semitransparent metals:
glass flake+Al layer
glass flake+Ag layer
glass flake+$TiO_2$ layer+Al layer
glass flake+$TiO_2$ layer+Ag layer
glass flake+$Fe_2O_3$ layer+Al layer
glass flake+$Fe_2O_3$ layer+Ag layer The metal layers can be deposited by known methods such as CVD-, PVD-methods or by electroless plating.

In a further preferred embodiment the pearlescent pigments comprise at least one layer of low refractive and at least one layer of high refractive index material.

The low refractive index material refers to materials with a refractive index of <1.8, preferably of <1.7.

Pursuant to another embodiment of the invention the effect pigment comprises a plurality of layers of low refractive and high refractive materials, such as metal oxide(s) and/or metal sulfide(s). According to another embodiment of the invention said layers of low refractive and high refractive materials are alternately arranged on each other.

Especially preferred are alternating layers of high refractive materials with low refractive materials. Such pearlescent pigments are known to exhibit especially strong interference colours. Pearlescent pigments with such alternating layers are, for example, known from the DE 196 18 566 A1, DE 196 38 708, JP 7-246366, EP 1 025 168 A1 or EP 0 753 545 A2.

Furthermore, it is preferred that the low refractive material is a metal oxide which can be selected from the group consisting of silica, silica hydrate, silicon oxide hydroxide, silicon oxide hydroxide hydrate, alumina, alumina hydrate, aluminium oxide hydroxide, aluminium oxide hydroxide hydrate, and mixtures thereof.

Examples of suitable metal oxides having a refractive index of more than 1.8 are $TiO_2$, $Fe_2O_3$, $TiFe_2O_5$, Ti-suboxides, $Fe_3O_4$, $Cr_2O_3$, $ZrO_2$, $ZnO$, $SnO_2$, $Sn(Sb)O_2$ or mixtures thereof.

The $TiO_2$ layer can be in the rutile or anatase modification, preferably the $TiO_2$ layer is rutile. Especially preferred are glass flakes coated with $TiO_2$ and/or $Fe_2O_3$.

Pursuant to a preferred embodiment the glass flakes are coated preferably with one or more layers of metal oxide selected preferably from the group consisting of $TiO_2$, $Fe_2O_3$ and mixtures thereof.

Depending on the thickness of the layer(s) of $TiO_2$ and/or $Fe_2O_3$ and the thickness of the low refractive index layer a wide range of colour effects can be produced.

Pursuant to another embodiment of the invention, the one or more metal oxide layers of titanium dioxide is/are in the rutile modification. Rutile has a higher index of refraction compared to anatase and is less photoactive.

If the effect pigments of this invention containing $TiO_2$ in the high refractive index coating are used in out-door applications such as automotive applications a subsequent protection coating, e.g., a layer of silicon oxide and/or cerium oxide is preferably applied to suppress the photoactivity, if any. The protection coating can be composed of a first layer of silicon oxide and a second layer of cerium oxide and vice versa, wherein the latter arrangement of layers is particularly preferred.

In a further preferred embodiment the pearlescent pigments are so-called multilayer pigments which comprise the following coatings:
(A) a coating with a refractive index of n>1.8 and a average thickness of 50-350 nm,
(B) a coating with a refractive index of n<1.8 and a average thickness of 50-500 nm,
(C) a coating with a refractive index of n>1.8 and a average thickness of 20-350 nm.

The thickness of the coatings (A) (B) or (C) can be equal or may differ from each other. Preferably the thickness of the layers (A) and (C) are in the range of 20-350 nm, more preferred 50-250 nm and especially preferred 70-150 nm.

The coating (B) has preferably a thickness of 50-500 nm, more preferred of 100-200 nm and especially preferred 130-180 nm and is preferably $B_2O_3$, $SiO_2$ and/or $Al_2O_3$.

The thickness of the coatings (A) and (C) can be equal or may differ from each other. In a most preferable embodiment the coatings (A) and (C) are colourless coatings, especially $TiO_2$-coatings. The $TiO_2$-coating can exist in the rutile or anatase modification, preferably rutile. In order to apply a titanium dioxide coating in the rutile modification a precoat consisting of $SnO_2$, $Al_2O_3$ or $Fe_2O_3$ is first applied followed by a subsequent layer of titanium dioxide. The thickness of the precoat $SnO_2$ or $Fe_2O_3$ is preferably <10 nm and most preferably <5 nm.

Particularly preferred multi layer pearlescent pigments of the present invention are glass flakes comprised a composition according to claim 1 and comprising or consisting of coatings with the specified high and low refractive materials:

Glass flake+$TiO_2$+$SiO_2$+$TiO_2$
Glass flake+$Fe_2O_3$+$SiO_2$+$TiO_2$
Glass flake+$TiO_2$+$SiO_2$+$TiO_2$/$Fe_2O_3$
Glass flake+$TiO_2$/$Fe_2O_3$+$SiO_2$+$TiO_2$/$Fe_2O_3$
Glass flake+$TiO_2$/$Fe_2O_3$+$SiO_2$+$TiO_2$
Glass flake+$TiO_2$/$Fe_2O_3$+$SiO_2$+$Fe_2O_3$
Glass flake+$Fe_2O_3$+$SiO_2$+$TiO_2$/$Fe_2O_3$
Glass flake+$SiO_2$+$TiO_2$+$SiO_2$+$TiO_2$
Glass flake+$SiO_2$+$Fe_2O_3$+$SiO_2$+$TiO_2$
Glass flake+$SiO_2$+$TiO_2$+$SiO_2$+$TiO_2$/$Fe_2O_3$
Glass flake+$SiO_2$+$TiO_2$/$Fe_2O_3$+$SiO_2$+$TiO_2$/$Fe_2O_3$
Glass flake+$SiO_2$+$TiO_2$/$Fe_2O_3$+$SiO_2$+$TiO_2$
Glass flake+$SiO_2$+$TiO_2$/$Fe_2O_3$+$SiO_2$+$Fe_2O_3$
Glass flake+$SiO_2$+$Fe_2O_3$+$SiO_2$+$TiO_2$/$Fe_2O_3$ Glass flakes used in the present invention have a thickness preferably in the range of 0.05 to 10 μm, further preferably of 0.1 μm to 2.0 μm. Pursuant to another embodiment of the invention the thickness of the glass flakes is in a range of 0.05 μm to 1.0 μm, more preferably of 0.1 μm to 0.45 μm.

Very thin glass flakes are preferred, because very brilliant colour effects can be achieved with them. Preferably the glass flakes are produced by methods disclosed in the WO 2004/056716 A1, WO 2005/063637 A1 and the EP 0 289 240 A1, which are enclosed by reference therein.

Furthermore, for coating compositions containing the effect pigments of the present invention preferably very thin glass flakes are used as a substrate. Coatings, especially automotive coatings have a rather low thickness when applied. Therefore, effect pigments based on thin substrates are likely to orient themselves very well in the coating.

The average particle size of the glass flakes used in the present invention is preferably in the range of 1 to 1000 μm, more preferably in the range of 5 to 500 μm. Preferred glass flakes have an average particle size in the range of 10 to 200 μm.

The aspect ratio of the glass flakes is preferably in the range of 20 to 10,000, preferably in the range of 200 to 3,000. Pursuant to another embodiment of the invention, the aspect ratio is in the range of 300 to 1,500.

If the high refractive index material comprises $TiO_2$ either alone or in admixture with another compound, such as $TiO_2$/$Fe_2O_3$, a subsequent layer of $SiO_2$ and/or cerium oxide is preferably applied if the photocatalytic activity of the pearlescent pigment is to be isolated from the surrounding. Such protective coatings are described in the DE 10 2004 041 592 A1 and DE 10 2004 041 586 A1, the contents of which are incorporated herein by reference. Such effect pigments are especially preferred in automotive coatings.

In addition an anti-yellowing treatment, especially useful for plastic applications, can be applied to the coated glass flakes. Such coatings are described in the DE 38 24 809, DE 44 29 797 and EP 0 520 313, the contents of which are incorporated herein by reference.

It is also possible to additionally include colouring matters such as dyes, colorants, etc. into the layer(s) of high refractive material, such as a metal oxide layer, or a layer of low refractive material, such as a layer of SiO₂ or Al₂O₃, or as a separate layer onto the surface of the coating containing the at least one layer of high refractive material. Such colouring matter can be, for example, carmine, Prussian blue (ferric cyanoferrate (II)), carbon black, copper phthalocyanines, diketo pyrrolo pyrrolidones, chinacridones, indolines, isoindolines, azopigments, anthrachinones, FD&C dyes or FD&C lakes.

The surface of the effect pigments of the present invention may also be organic-chemically modified. Such an organic-chemical surface modification may render the effect pigments a leafing behaviour or a non-leafing behaviour.

Furthermore, such an organic-chemical surface modification may introduce chemically reactive groups which allow a chemical reaction with binding agents of a coating, paint, ink, printing ink, etc. By chemically reacting the surface coupled reactive groups with the binding agent, the weather stability of the resulting coating is strongly improved. Such organic-chemical surface modifications are known from WO 99/57204 where reactive orientation auxiliary agents are coupled to the effect pigment surface. The contents of the WO 99/57204 is incorporated herewith by reference.

Particular useful reactive orientation auxiliary agents or coupling agents to be coupled to the surface of the effect pigments are the following organofunctional silanes having useful organofunctional groups. The silanes marketed by Degussa, Rheinfelden, Germany, under the trade name Dynasylan® or by OSi Specialties under the trade name Silquest® are particularly useful. Furthermore, the organosilanes marketed by Wacker AG, München, Germany, under the trade name GENIOSIL®, especially the so called α-silanes, can be likewise used.

The following compounds are particularly preferred:
3-Methacryloxypropyl trimethoxy silane (Dynasylan MEMO, Silquest A-174NT), vinyl tri(m)ethoxy silane (Dynasylan VTMO bzw. VTEO, Silquest A-151 bzw. A-171), 3-mercaptopropyl tri(m)ethoxy silane (Dynasylan MTMO oder 3201; Silquest A-189), 3-glycidoxypropyl trimethoxy silane (Dynasylan GLYMO, Silquest A-187), tris-(3-trimethoxysilyl propyl) isocyanurate (Silquest Y-11597), gamma-mercaptopropyl trimethoxy silane (Silquest A-189), bis-(3-triethoxysilyl propyl) polysulfide (Silquest A-1289), bis-(3-triethoxysilyl) disulfide (Silquest A-1589), beta-(3,4-epoxycyclohexyl)ethyl trimethoxy silane (Silquest A-186), bis(triethoxysilyl)ethane (Silquest Y-9805), gamma-isocyanato propyltrimethoxy silane (Silquest A-Link 35, GENIOSIL GF40), (methacryloxy methyl) tri(m)ethoxy silane (GENIOSIL XL 33, XL 36), (methacryloxy methyl) (m)ethyldimethoxy silane (GENIOSIL XL 32, XL 34), isocyanato methyl) trimethoxy silane (GENIOSIL XL 43), (isocyanato methyl)methyldimethoxy silane (GENIOSIL XL 42), (isocyanato methyl) trimethoxy silane (GENIOSIL XL 43) 3-(triethoxysilyl) propyl succinic anhydride (GENIOSIL GF 20) or mixtures thereof.

Also the so called α-silanes can be used as coupling agents.

According to another preferred embodiment of the invention the effect pigments can be coated, preferably in addition to the aforementioned silanes, with at least one amino functional silane. The amino function is an organofunctional group and can undergo chemical interactions with chemical groups of most of the binding agents. The interaction can be covalent bonds, e.g. with isocyanato groups of binding agents, hydrogen bonds with OH or COOH groups of binding agents, or ionic interactions. An amino function is a useful chemical function for creating chemical bonds with a great variety of binding agents.

The following compounds are particularly preferred:
Aminopropyl trimethoxy silane (Dynasylan AMMO; Silquest A-1110), aminopropyl triethoxy silane (Dynasylan AMEO) or N-(2-aminoethyl)-3-aminopropyl trimethoxy silane (Dynasylan DAMO, Silquest A-1120) or N-(2-aminoethyl)-3-aminopropyl triethoxy silane, triamino-functional trimethoxy silane (Silquest A-1130), bis-(gamma-trimethoxy silylpropyl) amine (Silquest A-1170), N-ethyl-gamma-amino isobutyl trimethoxy silane (Silquest A-Link 15), N-phenyl-gamma-aminopropyl trimethoxy silane (Silquest Y-9669), 4-amino-3,3-dimethylbutyl trimethoxy silane (Silquest Y-11637), N-cyclohexyl aminomethyl methyldiethoxy silane (GENIOSIL XL 924), (N-cyclohexyl aminomethyl) triethoxy silane (GENIOSIL XL 926), (N-phenyl aminomethyl) trimethoxy silane (GENIOSIL XL 973) or mixtures thereof.

The effect pigments of the present invention are characterised by a particular quality regarding its optical properties as well as mechanical stability. As set forth above the effect pigments are often exposed to shear forces, for example, when pumping the effect pigments through circulation lines or when mixing the pigments into paints, inks, plastics, etc. or during application of the effect pigments, e.g. nozzle spraying or during recycling of used effect pigments.

The effect pigments of the present invention are advantageously useful for many purposes, such as, for colouring of plastics, glasses, ceramic products, agriculture foils, decorative cosmetic formulations, in particular coatings, especially automotive coatings, and inks, including printing inks.

The effect pigments of the present invention can be used in all customary printing processes, for example offset printing, intaglio printing, bronze printing, flexographic printing, etc. Furthermore the effect pigments of the present invention can be used as functional pigments like conductive pigments, as magnetic pigments or to make media laser-markable. The media can be, for example, plastics, board products or papers. Furthermore, the effect pigments of the present invention can be used in cosmetic formulations such as nail polish, lip stick, make-up, hair care products, skin formulations, mascaras, eye-shadow, eyeliner, shower gel, shampoos, rouge, perfume, Eau de Toilette, cosmetic powders (pressed or loose), tooth paste or Tattoo formulations.

The effect pigments of the present invention are also advantageously useful for the above-mentioned applications in admixture with filler pigments, transparent pigments, or hiding white, coloured, black organic and/or inorganic pigments. The effect pigments of the present invention can also be used in admixture with conventional transparent, coloured or black pearlescent pigments based on metal oxide coated mica, TiO₂ flakes, SiO₂ flakes or Al₂O₃ flakes and coated or uncoated metal pigments, cholesteric flakes, BiOCl pigments, platelet shaped iron oxides, or graphite flakes.

The effect pigments of the present invention are particularly suited to be mixed with conventional effect pigments, such as metal effect pigments or pearlescent pigments, to produce particularly shiny colours which can have an effect of deepness. The effect pigments pursuant to the present invention are particularly durable, high gloss and high chroma pearlescent pigments. The metal effect pigments comprise for example, metal effect pigments made from aluminium, brass, copper or iron or alloys thereof.

Additionally, the inventive pigment mixtures can contain organic or inorganic colorants, thixotropy agents, wetting agents, dispersing agents, water, and/or organic solvent or solvent mixtures, etc.

The effect pigments of the present invention can be formulated as a free flowing pigment powder. Preferably, the pigment powder is a low or non-dusting powder of the effect pigments of the present invention.

The effect pigments of the present invention can also be formulated, for example, together with binding agents in the form of granules, pellets, tablets or in a pasty consistency.

The pigment mixtures of the invention are simple and easy to handle. The pigment mixtures can be incorporated into any system in which it is to be used by simple mixing. Laborious milling and dispersing procedures for the pigments are not necessary.

The effect pigments of the invention can be used for pigmenting and/or coating of materials, printing inks, plastics, agricultural films, button pastes, for the coating of seed, for the colouring of food, coatings of foods, medicaments or cosmetic formulations.

The concentration of the effect pigments of the invention in a system in which it is to be used for pigmenting or colouring is generally between 0.01 and 50% by weight, preferably between 0.1 and 5% by weight, based on the overall solids content of the system. This concentration is generally dependent on the specific application.

Plastics comprising the pigment mixture of the invention in amounts of 0.1 to 50% by weight, in particular from 0.5 to 7% by weight, are frequently notable for a particular brilliance, based on the weight of said pigmented plastics.

In the coating sector, especially in automotive finishing, the glass flakes are employed in amounts of 0.1 to 10% by weight, based on the weight of the pigmented coating composition.

In the pigmentation of binder systems, for example for paints and printing inks for intaglio, offset or screen printing, the pigment is incorporated into the printing ink in amounts of 2-50% by weight, preferably 5-30% by weight and in particular 8-15% by weight, based on the weight of the pigmented printing ink, paint, etc.

The invention likewise provides pigment preparations comprising effect pigments of the present invention, binders and, if desired, additives, the said preparations being in the form of substantially solvent-free, free-flowing granules.

Such granules can contain up to 95% by weight of the inventive pigments wherein the remainder can be binding agent, and/or solvent and/or additives, etc. A pigment preparation in which the glass flakes of the invention are pasted up with a binder and with water and/or an organic solvent, with or without additives, and the paste is subsequently dried and brought into a compact particulate form, e.g. granules, pellets, briquettes, a master batch or tablets, is particularly suitable as a precursor for printing inks but not limited to it.

The object underlying the present invention is also solved by a method of producing an effect pigment of any one of claims 1 to 20, comprising the steps:
(a) coating glass flakes comprising the following composition:
65-75 wt.-% silicon oxide, preferably $SiO_2$
2-9 wt.-% aluminium oxide, preferably $Al_2O_3$
0.0-5 wt.-% calcium oxide, preferably CaO
5-12 wt.-% sodium oxide, preferably $Na_2O$
8-15 wt.-% boron oxide, preferably $B_2O_3$
0.1-5 wt.-% titanium oxide, preferably $TiO_2$
0.0-5 wt.-% zirconium oxide, preferably $ZrO_2$,
based on the weight of said glass flakes,
with at least one layer of at least one high refractive material, said material having a refractive index of at least 1.8, and/or with at least one layer of at least one semitransparent metallic material,
(b) optionally calcining said layered glass flakes obtained by step (a).

Pursuant to a preferred embodiment the glass flakes are coated with at least one layer of a high refractive material and/or with at least one layer of at least one semitransparent metallic material by wet chemical coating, physical vapour deposition, chemical vapour deposition, or electroless plating.

The glass flakes can be coated in the same way as, e.g., mica based pearlescent pigments. Coatings with a metal oxide may be accomplished by any known methods, such as hydrolysis of a metal salt by heating or alkali, which deposits hydrated metal oxide, optionally followed by calcination.

In general, the procedure can involve dispersing of the glass flakes in a suitable solvent, for example organic solvent or water or a water/organic solvent mixture, and combining that dispersion with a precursor which forms a hydrous metal oxide film coating or semitransparent metallic coating on the flakes. The precursor can be metal salts hydrolysed and subsequently deposited on the glass flake surface.

For example, after the glass flakes are dispersed in water and placed in an appropriate vessel, the appropriate metal salts are added. The pH of the resulting dispersion is maintained at an appropriate level during the addition of the metal salts by simultaneous feeding a suitable base, for example sodium hydroxide, to cause precipitation of the hydrous metal oxide on the glass flakes. An aqueous acid, for example hydrochloric acid, can be used for adjusting the pH. The coated platelets can, if desired, be washed and dried before being calcined to the final pigment. Appropriate procedures are described in detail in U.S. Pat. No. 5,433,779 and in the German Patents 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 3211 602 and 32 35 017 the contents of which are incorporated herewith by reference.

Alternatively, alkoxy metal compounds can be dispersed in an organic solvent. The hydrolysis of said alkoxy metal compounds can be started by adding water, for example in an amount of about 1 to 20 wt.-%, preferably 5 to 10 wt.-%, based on the weight of the organic solvent. After hydrolysis of the alkoxy metal compounds, a metal oxide layer is formed on the surface of the glass flakes. As organic solvent preferably alcohols such as ethanol, n-propanol or isopropanol and mixtures thereof can be used.

The effect pigments obtained by wet chemically coating are characterized in that one or more homogeneous layers are enrobing the glass flakes, i.e. all sides and edges of the glass flakes.

The effect pigments of the present invention can also be prepared by gas phase decomposition of volatile metal compounds, e.g. CVD (chemical vapour deposition) or PVD (physical vapour deposition) or electroless plating by procedures known in the art.

The object underlying the present invention is further solved by the use of effect pigments of any one of claims 1 to 20 in plastics, coatings, powder coatings, paints, inks, printing inks, glasses, ceramics, agriculture foils, cosmetics, tattoo formulations, and foods.

The object of the invention is also solved by formulations and preparations containing the effect pigments of any one of claims 1 to 20. Said formulations and preparation comprises plastics, lasermarkable plastics, coatings, powder coatings, paints, inks, printing inks, glasses, ceramics, agriculture foils, cosmetics, tattoo formulations and foods.

Especially preferred are coatings containing the effect pigments of this invention. Coating formulations containing the effect pigments further comprise preferably at least one binder and at least one solvent like water and/or organic solvent(s).

The coatings can involve automotive coatings, powder coatings as well as industrial coatings. Especially preferred are automotive coatings.

In a powder coating, such as a powder lacquer, the coating composition can be essentially solvent-free and is preferably solvent-free.

The binders may be curable physically, or thermally or thermally and with actinic radiation. The latter is referred to by those in the art as dual cure.

In the context of the present invention, the term "physical curing" denotes the curing of a layer of a coating material by film formation through loss of solvent from the coating material, with linking within the coating taking place via looping of the polymer molecules of the binders (regarding the term, cf. Römpp Lexikon, Lacke and Druckfarben, 1998, Georg Thieme Verlag, Stuttgart, Germany, pages 73 and 74, "Bindemittel"). Alternatively, filming takes place by way of the coalescence of binder particles (cf. Römpp, op. cit., pages 274 and 275, "Härtung"). Normally, no crosslinking agents are required for this purpose. If desired, the physical curing may be assisted by atmospheric oxygen, by heat, or by exposure to actinic radiation.

Where the binders are thermally curable, they may be thermally externally crosslinking or self-crosslinking, especially externally crosslinking. In the context of the present invention, the term self-crosslinking" refers to the property of a binder whereby it enters into crosslinking reactions with itself. A prerequisite for this is that the binders already include both kinds of complementary reactive functional groups that are necessary for thermal crosslinking, or reactive functional groups which are able to react "with themselves". Externally crosslinking, on the other hand, is the term used to refer to those binders in which one kind of complementary reactive functional groups is present in the binder and the other kind in a curing or crosslinking agent. For further details, reference is made to Römpp, op. cit., "Härtung", pages 274 to 276, especially page 275, bottom.

The binders of the coatings are oligomeric and polymeric resins. By oligomers are meant resins containing at least 2 to 15 monomer units in the molecule. In the context of the present invention, polymers are resins which contain at least 10 repeating monomer units in the molecule. For further details of these terms, reference is made to Römpp, op. cit., page 425, "Oligomere".

Examples of suitable binders are random, alternating and or block, linear and or branched and or comb addition (co)polymers of ethylenically unsaturated monomers, or polyaddition resins and or polycondensation resins. Regarding these terms, reference is made for further details to Römpp, op. cit., page 457, "Polyaddition" and "Polyadditionsharze (Polyaddukte)", and also pages 463 and 464, "Polyckondensate", "Polykondensation" and "Polykondensationsharze", and also pages 73 and 74, "Bindemittel".

Examples of suitable addition (co)polymers are (meth)acrylate (co)polymers or partially saponified polyvinyl esters, in particular (meth)acrylate copolymers, especially polyurethane modified (meth)acrylate copolymers.

Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polyurethanes, polyether-polyurethanes or polyester-polyether-polyurethanes, especially polyesters and polyurethanes.

Preferably, binders are used which contain carboxyl groups and preferably have an acid number of from 10 to 100 mg of KOH/g of binder and more preferably from 40 to 80 mg of KOH/g of binder. It is also preferred for these binders to have molecular weights of from 500 to about 5,000 g/mol.

The ratio of the proportions by weight of the inventive effect pigment to the binder is from 10:1 to 1:10, preferably from 5:1 to 1:5 and more preferably from 3:1 to 1:3.

The coating compositions of the present invention further contain water and/or organic solvent(s). The organic solvent(s) are preferably miscible with water.

In the context of the present invention, water miscible organic solvents are typical paint solvents which are miscible in any proportion with water, such as ethylene glycol, propylene glycol, butyl glycol and the methyl, ethyl or propyl ethers thereof, ketones such as acetone or diacetone alcohol, cyclic ethers such as tetrahydrofuran or dioxane, or amides such as N,N-dimethylformamide or N-methylpyrrolidone (cf. Paints Coatings and Solvents, edited by Dieter Stoye and Werner Freitag, second edition, Wiley-VCH, Weinheim and New York, 1998, pages 329 and 330).

The organic solvents which are immiscible with water or sparingly miscible with water accommodate preferably less than 10, more preferably less than 9, and in particular less than 8% by weight of water at 20° C., based on water and solvent. Conversely, water accommodates preferably less than 6, more preferably less than 5, and in particular less than 4% by weight, at 20° C., based on water and solvent. Examples of suitable organic solvents immiscible with water or sparingly miscible with water are ketones such as methyl isobutyl ketone, diisobutyl ketone, cyclohexanone or trimethylcyclohexanone, ethers as dibutyl ether, esters such as isopropyl acetate, butyl acetate, ethyl glycol acetate or butyl glycol acetate, or higher alcohols such as hexanol, cyclohexanol, trimethylcyclohexanol or 2-ethyl-1-hexanol (isooctanol) (cf. Paints Coatings and Solvents, edited by Dieter Stoye and Werner Freitag, second edition, Wiley-VCH, Weinheim and New York, 1998, pages 329 and 330).

Furthermore the coating compositions can optionally contain suitable fillers. Examples of suitable organic and inorganic fillers are chalk, calcium sulfates, barium sulfate, silicates such as talc, mica or kaolin, silicas, oxides such as aluminum hydroxide or magnesium hydroxide, glass flakes, or organic fillers such as polymer powders, especially those of polyamide or polyacrylonitrile. For further details, reference is made to Römpp, op. cit., pages 250 ff., "Füllstoffe".

It may be of advantage to use mixtures of platelet-shaped inorganic fillers such as talc or mica and non platelet shaped inorganic fillers such as chalk, dolomite, calcium sulfates or barium sulfate, since by this means it is possible effectively to set the viscosity and the rheology.

The coating material of the invention may additionally comprise additives such as nanoparticles or reactive diluents which are curable thermally or with actinic radiation. In the context of the present invention, actinic is electromagnetic radiation, such as near infrared, visible light, UV radiation or X-rays, especially UV and corpuscular radiation such as electron beams.

Furthermore the inventive coating composition may contain further additives such as for example UV absorbers, light stabilizers, free-radical scavengers, thermolabile free-radical initiators, photoinitiators and photocoinitiators, crosslinking agents, thermal crosslinking catalysts, devolatilizers, slip additives, polymerization inhibitors, defoamers, emulsifiers, wetting agents, dispersants, adhesion promoters, leveling agents, film forming auxiliaries, rheology control additives (thickeners), flame retardants, siccatives, dryers, antiskinning agents, corrosion inhibitors, waxes and or flatting agents.

EXAMPLES

The invention is further illustrated by the following examples, however, without limiting the scope of invention.

Example 1

200 g of glass flakes (supplied by Glassflakes Ltd. Forster Street Leeds LS10 1 PW, United Kingdom) having a composition as specified in Table A with a mean particle thickness of 1 µm and particle diameters in the range of 50-150 µm and a $d_{50}$ of 88 µm were dispersed in 2 l of de-ionized water and the suspension was heated up 80° C. under stirring. Subsequently, the pH was adjusted to 1.9 using diluted hydrochloric acid and an acidic solution of 3 g $SnCl_4*5H_2O$ in 60 ml of diluted hydrochloric acid was added to the suspension within 60 minutes. Simultaneously, a solution of sodium hydroxide (10% W/W in water) was metered in order to keep a constant pH of 1.9. After the addition of the tin compound, the reaction mixture was stirred for 15 min to complete the precipitation. Then, the pH is lowered to 1.6 using diluted hydrochloric acid and a solution of $TiCl_4$ in water (400 g $TiCl_4$/l) was added to the suspension with 0.33 ml/min. The pH value was kept constant at 1.6 by co-dosage of sodium hydroxid (10% W/W in water). After 4 h a brilliant silver tone was achieved. The addition of the $TiCl_4$ solution was stopped and the reaction mixture was stirred for additional 15 minutes. After separation of the solids by filtration, the filter cake was washed using de-ionized water and calcined for 30 minutes at 650° C. A highly brilliant pearlescent pigment with silver-white reflection colour is obtained. According to X-ray powder diffractometric analysis, the crystal modification of the $TiO_2$ is pure rutile.

TABLE A

| * Composition (X-ray analysis): | |
|---|---|
| $SiO_2$: | 68.6 wt.-% |
| $Al_2O_3$: | 4.1 wt.-% |
| CaO: | 1.8 wt.-% |
| MgO: | 1.2 wt.-% |
| $K_2O$: | 2.0 wt.-% |
| $Na_2O$: | 10 wt.-% |
| $B_2O_3$: | 9.9 wt.-% |
| $TiO_2$: | 1.6 wt.-% |
| $ZrO_2$: | 0.1 wt.-% |

Comparative Example 2

The same procedure as in example 1 was repeated using glass flakes of an ECR-Glass composition having a composition as specified in Table B with the same particle sizes of 50-150 µm and a $d_{50}$ of 87 µm.

TABLE B

| Composition according to manufacturer (Glassflakes Ltd. Forster Street Leeds LS10 1PW, United Kingdom): | |
|---|---|
| $SiO_2$: | 64-70 wt.-% |
| $Al_2O_3$: | 3-6 wt.-% |
| CaO: | 3-7 wt.-% |

TABLE B-continued

| Composition according to manufacturer (Glassflakes Ltd. Forster Street Leeds LS10 1PW, United Kingdom): | |
|---|---|
| MgO: | 1-4 wt.-% |
| $K_2O$: | 0-3 wt.-% |
| $Na_2O$: | 12-13 wt.-% |
| $B_2O_3$: | 2-5 wt.-% |
| $TiO_2$: | 0-3 wt.-% |
| $ZrO_2$: | — |
| ZnO: | 1-5 wt.-% |

Example 3

Analogous to example 1, but the $TiCl_4$-solution was added for 23 h with 0.33 ml/min leading to a pearlescent pigment with intensive red interference color.

Comparative Example 4

Commercially available pearlescent pigment Reflecks Sparkling Red (BASF-Catalysts).

Comparative Example 5

Commercially available pearlescent pigment Miraval 5422 Magic Red (MERCK).

The pigments of examples 1 and 3 as well as of comparative examples 2, 4 and 5 to were mixed into conventional nitrocellulose laquer (Erco Bronzelack, Dr. Renger, Germany) and draw-downs were made on contrast paper. The gloss was measured at 60° using a Micro-Tri-Gloss (Byk-Gardner) instrument. The results are shown in table 1.

TABLE 1

| Sample | Gloss (60°), black background | Gloss (60°), white background |
|---|---|---|
| Example 1 | 102.5 (±1.2) | 105.5 (±0.2) |
| Comparative example 2 | 95.5 (±0.2) | 100.5 (±0.6) |
| Example 3 | 79.9 | — |
| Comparative example 4 | 65.0 | — |
| Comparative example 5 | 58.4 | — |

The gloss of the pearlescent pigment of example 1 is significantly higher than the pigments of comparative example 2. Both samples exhibited a silver interference color and had a similar particle size, particle size distribution and thicknesses. The red interference color pearlescent pigments of example 3 and of comparative examples 4 and 5 as well as the inventive pigment exhibited also a higher gloss than the pigments of the state of the art. The differences in the gloss are even more pronounced compared to the silver pigments.

Example 6

The early stages of precipitation of $SnO_2$ and of $TiO_2$ were analysed. For this purpose, example 1 was essentially repeated, however small samples of coated glass flakes were taken at defined reaction times of the reaction mixture (Table 1). The coating with $TiO_2$ was finally already stopped at 2 hours.

The samples were dried under vacuum at 60° C. The last sample was calcined for 30 minutes at 650° C.

The surface of the samples were analysed by SEM at different magnifications.

Comparative Example 7

Comparative Example 2 was essentially repeated using the glass flakes of the ECR-Glass of comparative example 2 as substrate, wherein samples were taken out at the same reaction times like in example 6. These samples were dried and then analyzed by SEM.

TABLE 2

Reaction stages and times of samples taken of

| Sample number | Reaction stage and time Example 6 | Reaction stage and time Comparative example 7 |
|---|---|---|
| a | $SnO_2$ coating/ 15 min | $SnO_2$ coating/ 15 min |
| b | $TiO_2$ coating 5 min | $TiO_2$ coating 5 min |
| c | $TiO_2$ coating 5 min | $TiO_2$ coating 5 min |
| d | $TiO_2$ coating 15 min | $TiO_2$ coating 15 min |
| e | $TiO_2$ coating 30 min | $TiO_2$ coating 30 min |
| f | $TiO_2$ coating 60 min | $TiO_2$ coating 60 min |
| g | $TiO_2$ coating 120 min | $TiO_2$ coating 120 min |

In FIGS. 1a,b the SEM pictures of selected samples of example 6 and comparative example 7, compiled in Table 2, are compared. It can be clearly seen that at the very early stages of coating the glass flakes with metal oxides, e.g. 15 min after $SnO_2$ coating and 5 min after $TiO_2$ coating (FIG. 1a), the oxide grains of example 6 are much smaller compared with comparative example 7. In FIG. 1b one can depict that the oxide grains grow larger in the course of further coating. However, the oxide grains for example 6 remain always significantly smaller compared to the ones of comparative example 7. Even after calcining (sample g) the difference remains. Consequently, even recrystallisation processes of the $TiO_2$ layers which might occur at calcining do not affect the differences in the dimensions of the oxide grains which existed already before. In sample g a lot of oxide grains with sizes in the 100 nm range and larger can be observed for comparative example 6. Such particles do already significantly reduce the gloss of this pigment. Sample g of example 6, however, doesn't show such large oxide particles.

It is noted, that sample g corresponds to samples which were coated with titania for 2 hours. A silver tone is achieved at 4 hours coating time, however. Thus sample g represents a "pre-silver" pearlescent pigment. Silver is known to be the first colour tone of the interference series followed by gold, red, blue, green and than the second order colours. Consequently, these coloured pearl pigments will exhibit even larger oxide grains and gloss-reducing scattering effects will also increase. Thus the benefits of the smaller oxide grains of the inventive pearlescent pigments will accordingly increase at larger metal oxide thickness.

Tests Regarding Skin Feeling:
a Triangular Test

Comparative Example 8

Commercially available Firemist Blue (Pearlescent pigment from BASF Catalysts) for cosmetic use.

The pigments of example 1 and of comparative example 8 were compared in a triangular test. This test is designated to show whether two pigments exhibit a difference in skin feeling.

Procedure:
Three coded samples of the two different pigments where applied on the forearm of the panellist. The panellists arms where placed in a box to prevent the panellist from looking at the arms. Two of the samples are the same, one sample is different. The panellist was asked to touch the samples and to answer the following question: Which two samples are similar?
Result:
11 out of 20 panellist answered correctly.
This shows that the samples of example 1 and of comparative example 8 are significantly different (based on a significance level of $\alpha=0.05$)
b Panel Tests Skin Feeling
Panel tests regarding the skin feeling have conducted with the pigments of example 1 and comparative example 2.
Procedure:
Two coded samples where applied on the forearm of the panellist. The panellists arms where placed in a box to prevent the panellist from looking at the arms. The panellist was asked to touch the samples and to compare the two samples in regards to the parameter "smoothness" and ranked them from 0 (smooth)-10 (rough). 20 penallists have been evaluated.

This procedure is standard in cosmetic industry and described in: Morten C. Meilgaard/Gail Vance Civille/B. Thomas Carr "Sensory Evaluation Techniques"; CRC Press, $4^{th}$ edition, Chapter 7: Attribute Difference Tests.
Result:
The statistical comparison of the mean values of the sample ranking shows that the two samples have a significantly different skin feel in terms of smoothness (based on a significance level of $\alpha=0.05$).
The pigments of example 1 have a significantly better skin feel than the pigments of comparative example 2.

What is claimed is:

1. An effect pigment comprising as a substrate a glass flake with a coating, said coating comprising at least one layer of at least one high refractive material, said material having at least one of a refractive index of at least 1.8, and at least one layer of at least one semitransparent metallic material,
    wherein, said glass flakes comprising the following composition:
    65-75 wt.-% silicon oxide;
    2-9 wt.-% aluminium oxide;
    0.0-5 wt.-% calcium oxide;
    5-12 wt.-% sodium oxide;
    8-15 wt.-% boron oxide;
    0.1-5 wt.-% titanium oxide; and
    0.0-5 wt.-% zirconium oxide,
    based on the weight of said glass flakes,
    said glass composition having a softening point in a range of from 620° to 750° C. and wherein said glass flake substrate has an average thickness in the range of 0.05 to 10 µm and an average particle size in a range of from 1 to 1000 µm.

2. The effect pigment of claim 1, wherein said glass composition comprises a content of titanium oxide in a range of 0.5 to 2.5 wt.-%, based on the weight of said glass flake.

3. The effect pigment of claim 1, wherein said glass composition comprises a content of 67-73 wt.-% of silicon oxide, based on the weight of said glass flake.

4. The effect pigment of claim 1, wherein said glass composition comprises a content of 4-7 wt.-% of aluminium oxide, based on the weight of said glass flake.

5. The effect pigment of claim 1, wherein said glass composition comprises a content of 0.5-2.5 wt.-% of calcium oxide, based on the weight of said glass flake.

6. The effect pigment of claim 1, wherein said glass composition comprises a content of 8.5 to 14 wt.-% boron oxide based on the weight of said glass flake.

7. The effect pigment of claim 1, wherein said glass composition further comprises a content of zirconium oxide, in a range of 0.05 to 3 wt.-%, based on the weight of said glass flake.

8. The effect pigment of claim 1, wherein said sodium oxide is $Na_2O$ and wherein the glass composition comprises 6 to 11 wt.-% of said $Na_2O$ based on the weight of said glass flake.

9. The effect pigment of claim 1, wherein said glass composition comprises at least one of the following further components:
 0 to 6 wt.-% of at least one of potassium oxide and lithium oxide, and 0 to 6 wt.-% of magnesium oxide.

10. The effect pigment of claim 1, wherein said glass composition has a softening point below 800° C.

11. The effect pigment of claim 1, wherein said effect pigment comprises at least one layer of low refractive index material and at least one layer of at least one of high refractive index material and semitransparent metallic material.

12. The effect pigment of claim 1, wherein said at least one high refractive index material is selected from the group consisting of metal chalcogenides, metal oxyhalides, metal nitrides, metal carbides, and mixtures thereof.

13. The effect pigment of claim 12, wherein said at least one high refractive index material is selected from a group of metal oxides consisting of titanium dioxide, iron oxide, chromium oxide, copper oxide, zinc oxide, tin oxide, vanadium oxide, cobalt oxide, nickel oxide, antimony oxide, lead oxide, silver oxide, molybdenum oxide, tungsten oxide, zirconium oxide, suboxides and mixtures thereof.

14. The effect pigment of claim 1, wherein at least one of tin oxide and aluminium oxide is coated between said glass flakes and a subsequent layer of high refractive index material.

15. The effect pigment of claim 12, wherein said high refractive index material is selected from a group of metal sulfides consisting of titanium sulfide, iron sulfide, chromium sulfide, copper sulfide, zinc sulfide, tin sulfide, vanadium sulfide, cobalt sulfide, antimony sulfide, lead sulfide, silver sulfide, molybdenum sulfide, tungsten sulfide, zirconium sulfide, subsulfides and mixtures thereof.

16. The effect pigment of claim 11, wherein said low refractive index material is selected from the group consisting of low refractive metal oxides.

17. The effect pigment of claim 1, wherein said glass flakes are coated with one or more layers of metal oxide selected from the group consisting of $TiO_2$, $Fe_2O_3$ and mixtures thereof.

18. The effect pigment of claim 1, wherein the high refractive index material is titanium dioxide in the rutile modification.

19. The effect pigment of claim 1, wherein said semitransparent metallic material is selected from metals of the group consisting of aluminium, chromium, titanium, copper, silver, gold, platinum, molybdenum, iron, tin, zinc, tantalum, its mixtures and alloys.

20. The effect pigment of claim 1 wherein components used in forming said glass flakes meet at least one of the following criteria:
 (a) the silicon oxide is $SiO_2$;
 (b) the aluminium oxide is $Al_2O_3$;
 (c) the calcium oxide is CaO;
 (d) the sodium oxide is $Na_2O$;
 (e) the boron oxide is $B_2O_3$;
 (f) the titanium oxide is $TiO_2$; and
 (g) the zirconium oxide is $ZrO_2$.

21. The effect pigment of claim 7, wherein the content of the zirconium oxide is 0.1 to 1.5 wt.-% based on the weight of said glass flake.

22. The effect pigment of claim 9, wherein the glass flake composition comprises from 1 to 4.0 wt.-% of at least one of potassium oxide, lithium oxide and magnesium oxide.

23. The effect pigment of claim 12, wherein the metal chalcogenide is selected from the group consisting of metal oxides, metal suboxides and metal sulfides.

24. The effect pigment of claim 16, wherein the low refractive index metal oxide is selected from the group consisting of silica, silica hydrate, silicon oxide hydroxide, silicon oxide hydroxide hydrate, alumina, alumina hydrate, aluminium oxide hydroxide, aluminium oxide hydroxide hydrate, and mixtures thereof.

25. The effect pigment of claim 1, wherein the average thickness of said glass flake is in a range of 100 nm to 1,000 nm.

26. The effect pigment of claim 22, wherein the potassium oxide is $K_2O$, the lithium oxide is $Li_2O$ and the magnesium oxide is MgO.

* * * * *